(12) United States Patent
Xu et al.

(10) Patent No.: US 10,681,565 B2
(45) Date of Patent: Jun. 9, 2020

(54) METHOD FOR DETECTING CAUSE OF RADIO LINK FAILURE OR HANDOVER FAILURE

(71) Applicant: Samsung Electronics Co., Ltd., Suwon-si, Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/724,264

(22) Filed: Dec. 21, 2012

(65) Prior Publication Data

US 2013/0165108 A1 Jun. 27, 2013

(30) Foreign Application Priority Data

Dec. 23, 2011 (CN) .......................... 2011 1 0439340
May 10, 2012 (CN) .......................... 2012 1 0144838

(51) Int. Cl.
*H04W 76/19* (2018.01)
*H04W 24/00* (2009.01)
*H04W 24/04* (2009.01)

(52) U.S. Cl.
CPC ........... *H04W 24/00* (2013.01); *H04W 24/04* (2013.01); *H04W 76/19* (2018.02)

(58) Field of Classification Search
CPC .... H04W 36/24; H04W 36/00; H04W 76/027
USPC .......................... 455/423, 436, 439, 443, 438
See application file for complete search history.

(56) References Cited

U.S. PATENT DOCUMENTS

2009/0046573 A1    2/2009  Damnjanovic
2010/0173626 A1*   7/2010  Catovic ............... H04W 76/027
                                                 455/423
2010/0173633 A1    7/2010  Catovic et al.
(Continued)

FOREIGN PATENT DOCUMENTS

CN      101959263 A     1/2011
EP      2 086 253 A1    8/2009

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2,(Release 11), Nov. 22, 2011, www.3GPP.org.*

(Continued)

*Primary Examiner* — Said M Elnoubi
(74) *Attorney, Agent, or Firm* — Jefferson IP Law, LLP (57) ABSTRACT

The present invention discloses a method for detecting a cause for a Radio Link Failure (RLF) or handover failure is provided. The method includes when a User Equipment (UE) enters a connection mode after encountering RLF or handover failure, sending a RLF report that the UE encounters RLF or handover failure to a base station; determining, by the base station, a cause for RLF or handover failure according to the RLF report, if it is determined that the cause for RLF or handover failure is a problem of Mobility Robustness Optimization (MRO) or a problem of coverage, when it is a problem of MRO, sending, by the base station, a MRO report to a base station at which a cell which triggers handover for the last time is located.

6 Claims, 7 Drawing Sheets

(56) References Cited

U.S. PATENT DOCUMENTS

2013/0183977 A1* 7/2013 Han .................. H04W 36/0055
 455/436
2015/0282037 A1 10/2015 Catovic et al.

OTHER PUBLICATIONS

Ahmad Awada, Bernhard Wegmann, Ingo Viering, and Anja Klein, "Self-Optimization Algorithm for Inter-RAT Con guration Parameters" Aug. 2011, IEEE 2011 8th International Symposium on Wireless Communication Systems.*
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2,(Release 11), (Sep. 2011) @ www.3GPP.org.*
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2,(Release 11), (2011-9) @ www.3GPP.org.*
Ahmad Awada, Bernhard Wegmann, Ingo Viering, and Anja Klein, "Self-Optimization Algorithm for Inter-RAT Configuration Parameters" Nov. 2011, IEEE 2011 8th International Symposium on Wireless Communication Systems.*
Awada et al., "Self-Optimization Algorithm for Inter-RAT Configuration Parameters," Aug. 2011, 8th International Symposium on Wireless Communication Systems, Aachen, p. 311-316 (Year: 2011).*
Nokia Siemens Networks, "Inter-RAT Mobility Failure Scenarios", R3-113009, XP050566151, Nov. 4, 2011.
"LTE; Evolved Universal Terrestrial Radio Access (E-UTRA) and Evolved Universal Terrestrial Radio Access Network (E-UTRAN); Overall Description; Stage 2; (3GPP TS 36.300 Version 103.0 Release 10)", XP014065364, Apr. 1, 2011.
Daniela Laselva et al, "Self-Optimisation", LTE Self-Organising Networks (SON), XP055091508, Dec. 9, 2011, Chichester, UK, pp. 135-234.

* cited by examiner

METHOD FOR DETECTING CAUSE OF RADIO LINK FAILURE OR HANDOVER FAILURE

PRIORITY

This application claims the benefit under 35 U.S.C. § 119(a) of a Chinese patent application filed on Dec. 23, 2011 in the Chinese Intellectual Property Office and assigned Serial No. 201110439340.0 and a Chinese patent application filed on May 10, 2012 in the Chinese Intellectual Property Office and assigned Serial No. 201210144838.9, the entire disclosures of which are hereby incorporated by reference.

BACKGROUND OF THE INVENTION

1. Field of the Invention

The present invention relates to the field of mobile communication systems. More particularly, the present invention relates to a method for detecting the cause of Radio Link Failure (RLF) or handover failure.

2. Description of the Related Art

Along with the development of communication technologies, the mobile communication system has evolved into a System Architecture Evolution (SAE) system.

Figure 1:
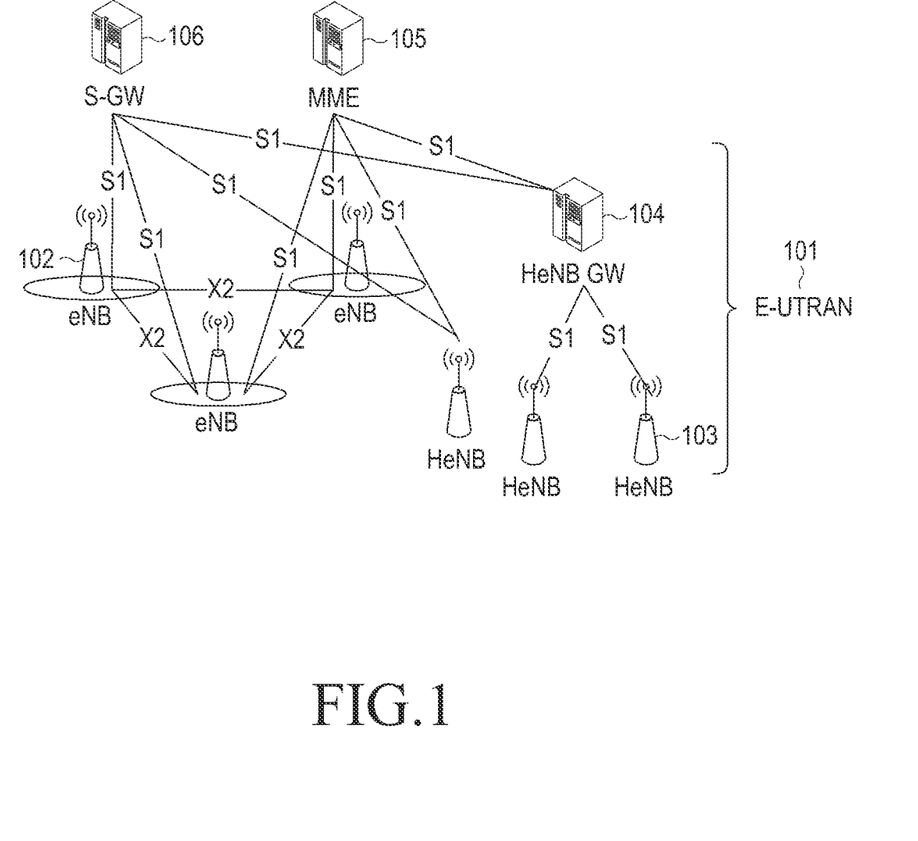
FIG. 1 is a schematic diagram illustrating a structure of a System Architecture Evolution (SAE) system according to the related art.

FIG. 1 is a schematic diagram illustrating a structure of a SAE system according to the related art.

Referring to FIG. 1, the SAE system includes an Evolved Universal Terrestrial Radio Access Network (E-UTRAN) 101 and a core network containing a Mobile Management Entity (MME) 105 and a Serving Gateway (S-GW) 106. The E-UTRAN 101 is configured to connect a User Equipment (UE) to the core network, and includes more than one evolved Node B (eNB) 102 and more than one Home eNB (HeNB) 103, and further includes an optional HeNB Gate-Way (HeNB GW) 104. The MME 105 and the S-GW 106 may be integrated in one module or may be implemented separately. An eNB 102 is connected with another eNB 102 via an X2 interface, and is connected with the MME 105 and the S-GW 106 respectively via an S1 interface. A HeNB 103 is connected with the MME 105 and the S-GW 106 respectively via an S1 interface; or is connected with the optional HeNB GW 104 via an S1 interface, and the HeNB GW 104 is then connected with the MME 105 and the S-GW 106 respectively via an S1 interface.

At an early stage of SAE system deployment or during an SAE system operating stage, a large number of human and material resources are typically required to optimize parameters of the SAE system, particularly radio parameters, so as to guarantee good coverage and capacity, mobile robustness, load balance when moving, and sufficient access speed of the UE in the SAE system. To save the manual and material resources consumed during deployment of the SAE system operation process, a method for self-optimizing the SAE system is currently proposed. During a self-optimization process, configurations of the eNB or HeNB are optimized according to a current state of the SAE system. Both the eNB and the HeNB may both be referred to as an eNB for convenience in explanation in the following description of the method for self-optimizing the SAE system.

Figure 2:
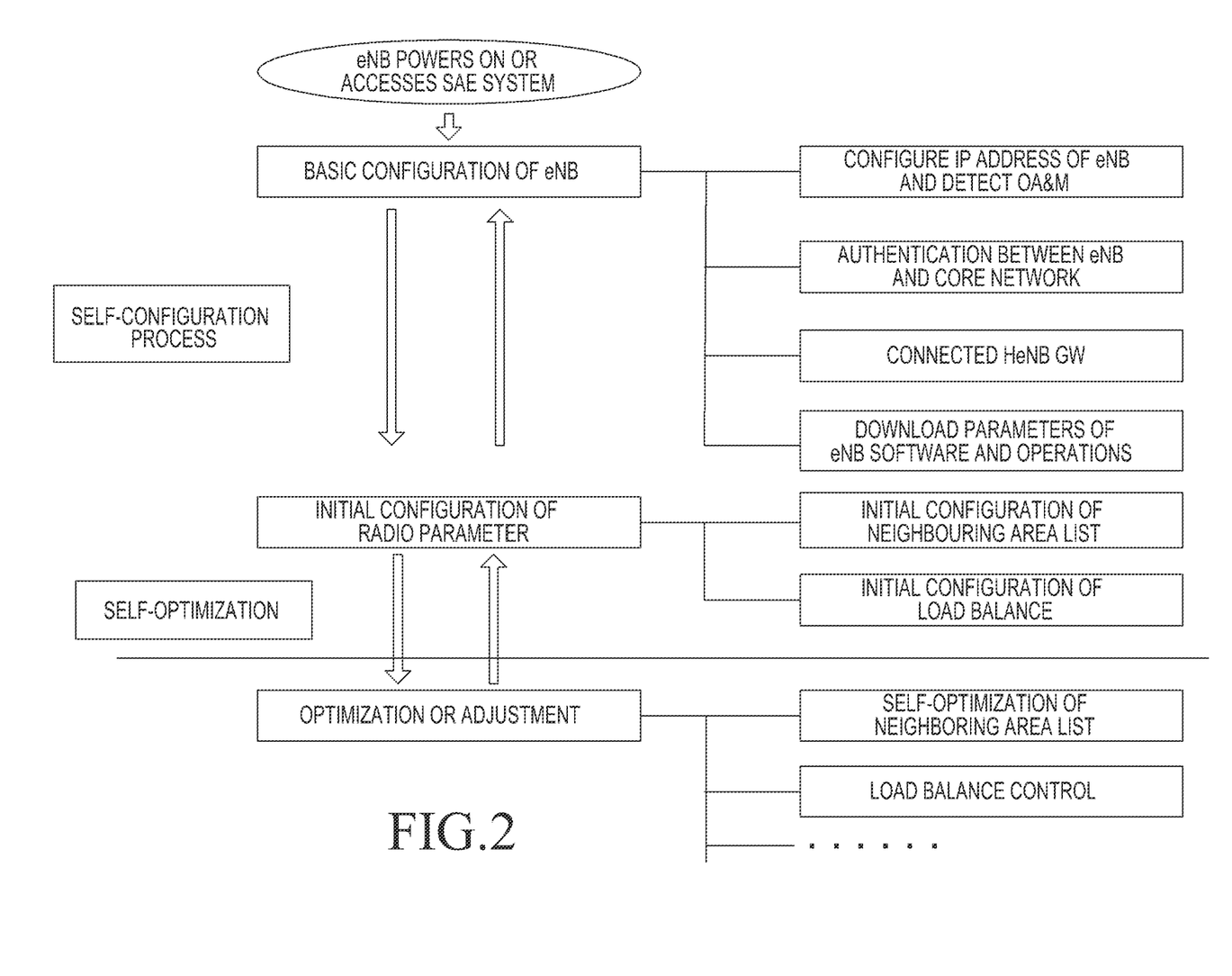
FIG. 2 is a schematic diagram illustrating a basic principle for self-optimizing a SAE system according to the related art.

FIG. 2 is a schematic diagram illustrating a basic principle for self-optimizing a SAE system according to the related art.

Referring to FIG. 2, after the eNB turns on power or accesses the SAE system, a self-configuring process can be started. The self-configuring process includes basic configuration and initial radio parameter configuration for the eNB. The basic configuration for the eNB includes configuring an Internet Protocol (IP) address of the eNB and detecting Operation Administration and Maintenance (OAM), authenticating between the eNB and the core network, detecting the HeNB GW to which the eNB belongs when the eNB is an HeNB, and downloading parameters of software and operations of the eNB for self-configuration. The initial radio parameter configuration is implemented according to experience or simulation. Because performance of each eNB in the SAE system will be affected by the environment of an area in which the eNB is located, the eNB initializes the radio parameter configuration according to the environment of the area in which the eNB is located. Specifically, the eNB performs the initial configuration for a neighboring area list and the initial configuration for the load balance. After the self-configuring process, many parameters configured by the eNB are not optimized. Therefore, in order to increase the performance of the SAE system, the configuration of the eNB should be optimized or adjusted, which is also referred to as self-optimization of the mobile communication system. The optimization or adjustment of the configuration of the eNB may be implemented by the eNB under the control of the OAM in the background. Specifically, there may be a standardized interface between the eNB and the OAM. The OAM transmits a parameter to be optimized to the eNB (i.e., eNB or HeNB) via the standardized interface, and then the eNB optimizes the parameter in the self-configuration according to the parameter to be optimized. In addition, the configuration of the eNB can also be optimized or adjusted by the eNB itself (e.g., the eNB detects and obtains performance to be optimized, and then optimizes or adjusts its parameter corresponding to the performance). Optimizing or adjusting the configuration of the eNB may include self-optimizing a neighboring area list, self-optimizing the coverage and capacity, self-optimizing the mobile robustness, self-optimizing the load balance, and self-optimizing a Random Access Channel (RACH) parameter (not shown), and the like.

Currently, basic principles of release 10 mobility robustness self-optimization are: when the UE re-enters a connection mode after encountering the RLF or the handover failure, the UE instructs the network that there is an available RLF report, and the network sends a message to the UE to request for the RLF report; the RLF report sent by the UE contains E-UTRAN Cell Global Identifier (ECGI) of the last cell servicing the UE, ECGI of a cell trying to be re-established, ECGI of a cell which triggers the handover process for the last time, time between triggering the handover for the last time and connection failure, and a cause of the connection failure being RLF or handover failure and radio measurement; the base station 1 which obtains the RLF report of the UE forwards the RLF report obtained from the UE to the base station 2 where the last cell servicing the UE is located; the last base station servicing the UE determines whether the cause of the RLF or handover failure is a too early handover, a too late handover, handover to a wrong cell, or a coverage hole; and if it is too early handover or handover to a wrong cell, then the base station sends a too early handover or handover to a wrong cell message to the base station 3 which triggers the too early handover or handover to a wrong cell message.

According to the related art, if it is too early handover or handover to a wrong cell, then the base station 2 sends the too early handover or handover to a wrong cell message to the base station 3. The base station 1 is required to forward the RLF report to the base station 2 so that the base station 2 can make a judgment, which results in low signaling efficiency. Further, according to the related art, there is another way in which the RLF report is forwarded to the base station 2 by the core network, which results in a much lower signaling efficiency and heavy load on the Network message transmission.

Further, the existing method for detecting RLF or handover failure applies only in Long Term Evolution (LTE) communication systems. When the existing mechanism is used to detect RLF or handover failure between different access technologies (inter-Radio Access Technologies (inter-RAT)), not only is the efficiency of the system particularly low, but also the existing RLF report reported by the UE cannot route RLF instruction and related information of the report between different RAT and cannot correctly detect problems of handover between different RAT.

Therefore, a need exists for a system and method for detecting a cause of a RLF or a handover failure. There is a need for a system and method that correctly detect a cause of the RLF or the handover failure and that are optimized to indicate a corresponding event to a base station in which a cell that causes the problem is located, such that the base station can perform correct self-optimization for the mobile communication system according to the detected cause, and such that the base station can improve performance of the mobile communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for detecting cause of a Radio Link Failure (RLF) or a handover failure. The system and method can correctly detect a cause of the RLF or the handover failure and are optimized to indicate a corresponding event to a base station in which a cell which causes the problem is located, such that the base station can perform correct self-optimization for the mobile communication system according to the detected cause, and such that the base station can improve performance of the mobile communication system.

In accordance with another aspect of the present invention, a method for detecting cause for at least one of a RLF and a handover failure is provided. The method includes when a User Equipment (UE) enters a connection mode after encountering the at least one of the RLF and the handover failure, sending an RLF report that the UE encounters the RLF or handover failure to a base station, determining, by the base station, a cause for the at least one of the RLF and the handover failure according to the RLF report, if it is determined that the cause for the at least one of the RLF and the handover failure is a problem of Mobility Robustness Optimization (MRO), sending, by the base station, an MRO report to a base station at which a cell which triggers handover for the last time is located, if it is determined that the cause for the at least one of the RLF and the handover failure is a problem of coverage, sending, by the base station, a coverage problem report to a base station at which the last cell serving the UE is located before the connection failure, wherein information of the coverage problem report includes a global cell identifier of the last cell serving the UE.

In an exemplary implementation, the RLF report comprises at least one of a Location Area Identifier (LAI) and a Route Area Code (RAC) of a cell in which the UE is located before the UE hands over to a cell in which the at least one of the RLF and the handover failure occurs, a cell identifier of the cell in which the UE is located before the UE hands over to the cell in which the at least one of the RLF and the handover failure occurs, the LAI and the RAC of a cell in which the UE tries Radio Resource Control (RRC) connection re-establishment or RRC connection establishment for the first time after the at least one of the RLF and the handover failure, and a cell identifier of the cell in which the UE attempts RRC connection re-establishment or RRC connection establishment for the first time after the at least one of the RLF or handover failure.

In an exemplary implementation, the problem of MRO comprises at least one of a too early handover, a too late handover, a handover to a wrong cell, a too early inter-Radio Access Technologies (inter-RAT) handover, or a too late inter-RAT handover.

In an exemplary implementation, the determining, by the base station, of the cause for the at least one of the RLF and the handover failure comprises if the UE has been handed over between different RAT recently and the cell in which the UE attempted to re-establish an RRC connection after the failure is a source cell or a cell of a source RAT, then the cause for the at least one of the RLF and the handover failure is a too early inter-RAT handover, if the UE has not been handed over recently, and the last cell serving the UE and the cell in which the RRC connection is attempt re-established are cells of different RAT, then the cause for the at least one of the RLF and the handover failure is a too late inter-RAT handover, if the UE has been handed over between different RAT recently, and the cell in which the UE attempt to re-establish an RRC connection for the first time after the failure is a cell different from the RAT type of the source cell and the target cell of the latest handover, then determining the cause for the at least one of the RLF and the handover failure to be a handover to a wrong RAT.

In an exemplary implementation, the MRO report comprises at least one of a RAT type of the target cell of the last handover, a RAT type of the source cell of a last handover, a RAT type of the cell in which the UE attempts RRC connection establishment or re-establishment for the first time after the at least one of the RLF and the handover failure, the cell identifier of the target cell of the last inter-RAT handover, the cell identifier of the source cell of the last inter-RAT handover, and the cell identifier of the cell in which the UE attempts RRC connection establishment or re-establishment for the first time after the at least one of the RLF and the handover failure.

In an exemplary implementation, the method further comprises, the base station at which the cell which triggers handover for the last time is located determines as a problem of inter-RAT handover, according to at least one of the RAT type of the target cell of the last handover, the RAT type of the source cell of the last handover, the RAT type of the cell in which the UE attempts RRC connection establishment or re-establishment for the first time after the at least one of the RLF and the handover failure, and the corresponding cell identifiers of the source cell and target cell of the last handover and the cell in which the UE attempts RRC connection establishment or re-establishment for the first time after the at least one of the RLF and the handover failure in the MRO report.

In an exemplary implementation, the base station which receives the MRO report determines as a problem of inter-RAT handover, according to at least one of the RAT type of the target cell of the last handover, the RAT type of the source cell of the last handover, the RAT type of the cell in which the UE tries RRC connection establishment or re-establishment for the first time after the RLF or handover failure, and the corresponding cell identifiers of the source cell and target cell of the last handover and the cell in which the UE tries RRC connection establishment or re-establishment for the first time after the RLF or handover failure in the MRO report.

In an exemplary implementation, the base station which receives the MRO report determines the problem of the inter-RAT handover according to inter-RAT handover problem indication in the MRO report.

In an exemplary implementation, if the cause for the at least one of the RLF and the handover failure is a problem of coverage, the base station sends a Cell Change Order (CCO) report to the base station at which the last cell serving the UE is located.

In accordance with another aspect of the present invention, a method for detecting cause for at least one of a Radio Link Failure (RLF) and a handover failure is provided. The method includes when a User Equipment (UE) enters a connection mode after encountering the at least one of the RLF and the handover failure, sending an RLF information report to a base station, sending, by the base station, the RLF report to the base station at which the last cell serving the UE is located, determining, by the base station at which the last cell serving the UE is located, that the cause for the at least one of the RLF and the handover failure is a problem of Mobility Robustness Optimization (MRO), according to the RLF report, if the UE has been handed over recently, and a target cell and a source cell of the last handover are cells of different radio Access Technologies (RAT), the cell in which the UE attempt to re-establish a connection and the source cell of the last handover are the same cell or in the same RAT, determining the cause for the at least one of the RLF and the handover failure to be a too early inter-RAT handover, sending, by the base station at which the last cell serving the UE is located, an MRO report to the base station which triggers handover for the last time.

In an exemplary implementation, the MRO report further includes a too early inter-RAT handover.

In an exemplary implementation, the MRO report further includes a global cell identifier of the cell in which the UE attempts to establish RRC connection for the first time after the failure.

In an exemplary implementation, the MRO report further includes at least one of the RAT type of the target cell of the last handover, and/or the RAT type of the source cell of the last handover, and/or the RAT type of the cell in which the UE attempts RRC connection establishment or re-establishment for the first time after the at least one of the RLF and the handover failure, and/or the cell identifier of the target cell of the last handover, the cell identifier of the source cell of the last handover, and the cell identifier of the cell in which the UE tries RRC connection establishment or re-establishment for the first time after the RLF or handover failure.

In an exemplary implementation, the base station which receives the MRO report determines as a problem of inter-RAT handover, according to at least one of the RAT type of the target cell of the last handover, the RAT type of the source cell of the last handover, the RAT type of the cell in which the UE attempts RRC connection establishment or re-establishment for the first time after the RLF or handover failure, and the corresponding cell identifiers of the source cell and target cell of the last handover and the cell in which the UE attempts RRC connection establishment or re-establishment for the first time after the at least one of the RLF and the handover failure in the MRO report.

In an exemplary implementation, the base station which receives the MRO report determines the problem of the inter-RAT handover according to inter-RAT handover problem indication in the MRO report.

In an exemplary implementation, if it is a problem of coverage, the base station sends a CCO report to the base station at which the last cell serving the UE is located.

According to an aspect of the present invention, in the method for detecting cause of RLF or handover failure, a RLF report including an indication that the UE encounters at least one of a RLF and a handover failure is sent to the base station by the UE, the base station which receives the RLF report determines a cause of encountering RLF or handover failure, and then the MRO report is sent by the base station to a base station at which a cell which triggers handover for the last time is located; or a RLF report containing encountering the at least one of the RLF and the handover failure is sent to the base station by the UE, the base station which receives the RLF report sends the RLF report to the base station at which the last cell serving the UE is located, and the base station where the last cell serving the UE is located determines that a cause for the at least one of the RLF and the handover failure, and then the MRO report containing inter-RAT handover problem indication is sent to the base station which triggers handover for the last time.

According to an aspect of the present invention, a base station which receives the RLF report is used to determine a cause for at least one of a RLF and a handover failure, and does not need to first transmit the RLF indication between the base stations and then send the RLF report; particularly, when the above messages are sent between different RAT, the messages are sent through the CN, the signaling process is complex. One aspect of the present invention is more optimized than the mechanisms according to the related art.

According to another aspect of the present invention, because the RLF report including related information of encountering inter-RAT failure is sent to the network and the base station which receives the RLF report or the last base station serving the UE determines a cause of the failure, thus, the cause why the UE encounters at least one of the RLF and the handover failure between different RAT can be correctly detected, and then correct self-optimization for the mobile communication system can be performed according to the detected cause, thereby improving the performance of the mobile communication system.

Finally, according to another aspect of the present invention, in the method, because the MRO report including the inter-RAT handover problem indication is sent to the base station which triggers handover for the last time; thus, the cause why the UE encounters the at least one of the RLF and the handover failure between different RAT can be correctly detected, and then correct self-optimization for the mobile communication system can be performed according to the detected cause, thereby improving the performance of the mobile communication system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In order to solve the problems in technology according to the related art, exemplary embodiments of the present invention provide a method for detecting a cause of a Radio Link Failure (RLF) or a handover failure, which specifically includes when a User Equipment (UE) encounters an RLF or a handover failure, when the UE enters a connection mode, an RLF report that indicates that the UE encounters the RLF or the handover failure is sent to a base station, the base station determines a cause of the RLF or the handover failure according to the RLF report, and if it is determined that the cause of the RLF or the handover failure is a problem of Mobility Robustness Optimization (MRO), the base station sends a MRO report to a base station at which the cell which triggers the handover for the last time is located, if it is determined that the cause of the RLF or the handover failure is a problem of coverage, then the base station sends a coverage problem report to a base station at which the last cell serving the UE is located before the connection failure, and information of the coverage problem report comprises a global identifier of the last cell serving the UE, or, when a UE encounters an RLF or a handover failure when the UE enters a connection mode, an RLF information report is sent to a base station; the base station sends the RLF report to a base station at which the last cell serving the UE is located; the base station at which the last cell serving the UE is located determines that the cause of the RLF or handover failure is a problem of Mobility Robustness Optimization (MRO) according to the RLF report, if the UE has been handed over recently, the target cell and the source cell of the last handover are cells of different Radio Access Technologies (RAT), and the source cell of the last handover are the same cell or in the same RAT, then the cause of the RLF or the handover failure is a too early inter-RAT handover; the base station at which the last cell serving the UE is located sends an MRO report to the base station which triggers the handover for the last time.

To make the objects, technical solution and advantages of exemplary embodiments the present invention more clear, exemplary embodiments of the present invention will be hereinafter described in detail with reference to the accompanying drawings and the exemplary embodiments.

Figure 3:
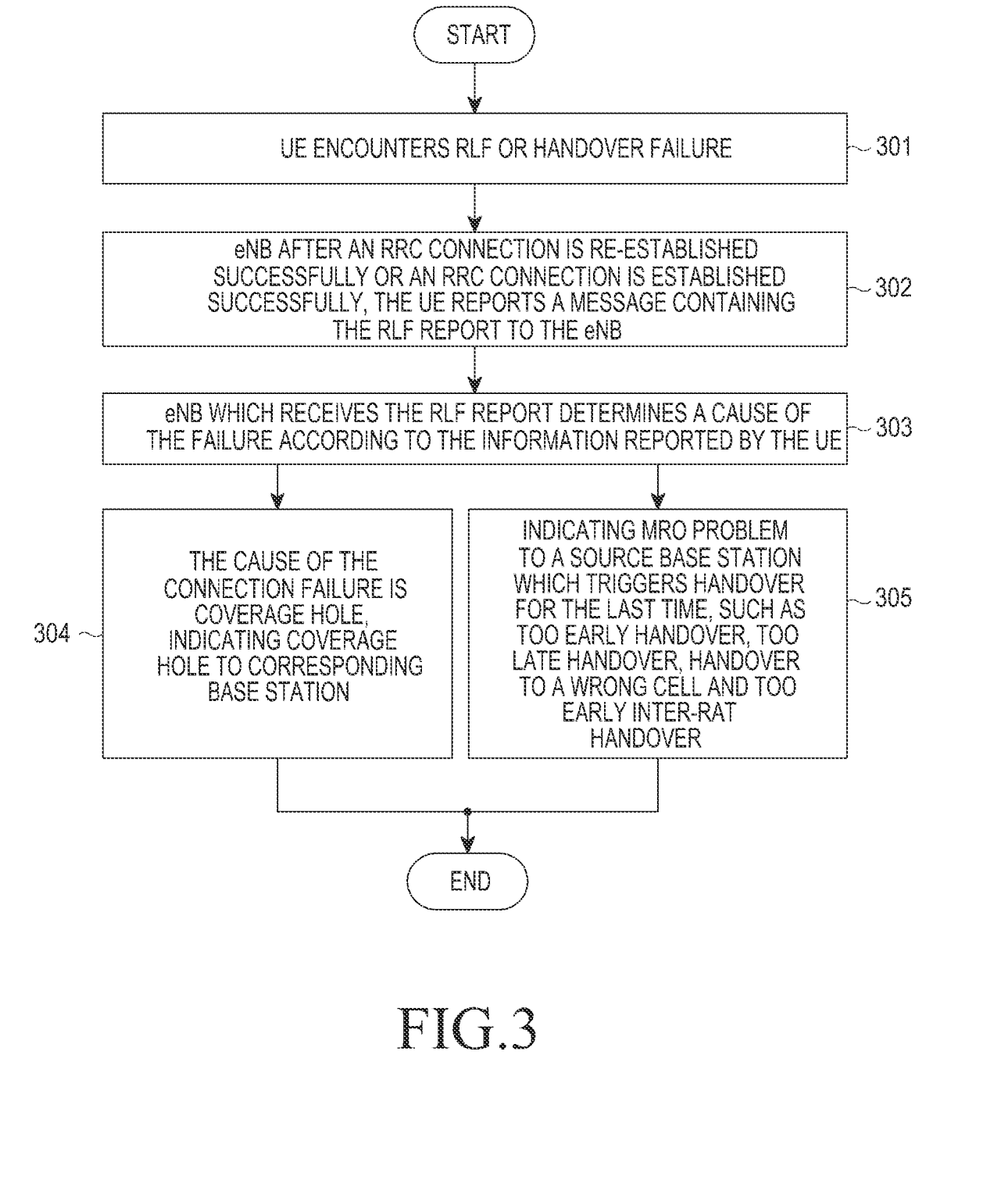
FIG. 3 is a flowchart of a first method for detecting a cause of a Radio Link Failure (RLF) or a handover failure according to an exemplary embodiment of the present invention.

FIG. 3 is a flowchart of a first method for detecting a cause of Radio Link Failure (RLF) or handover failure according to exemplary embodiments of the present invention.

Referring to FIG. 3, at step 301, the UE encounters a RLF or handover failure.

At step 301, the UE stores failure cell identifiers for a handover failure. The failure cell identifier can be set to be a global cell Identifier or physical cell ID and frequency of the target cell of the handover; for an RLF, the failure cell identifier can be set to be a global cell Identifier or physical cell ID and frequency of the cell where the RLF occurs. The stored previous cell identifier is the global cell Identifier or physical cell ID and frequency of the cell in which the UE receives a handover command for the last time before the failure.

If the cell in which the last handover command message was received by the UE is a Universal Mobile Telecommunications System (UTMS) cell, then a Location Area Identifier (LAI) and Route Area Code (RAC) in which the cell is located can also be included; if the cell is a LTE cell, then a Tracking Area Identifier (TAI) in which the cell is located can also be included. The UE stores time from receiving the last handover command to RLF or handover failure.

At step 302, after an RRC connection is re-established successfully or an RRC connection is established successfully, the UE reports the RLF report containing an indication that the UE encounters an RLF or a handover failure to the eNB.

At step 302, the RLF report comprises at least one of a failure cell identifier, a previous cell identifier, a cell identifier in which the UE tries RRC connection re-establishment or RRC connection establishment for the first time after failure, a time from the last handover command message to the RLF or handover failure, a measurement information of the UE, and a cause of the connection failure being an RLF or a handover failure.

The RLF report can further comprise at least one of a Radio Network Controller (RNC) identifier of an RNC at which the last cell serving the UE is located, an RNC identifier of an RNC at which a cell which triggers the handover process for the last time is located, and an RNC identifier of an RNC controlling the cell at which a the UE try re-established the connection. The RNC identifier may comprise a Location Area Identifier (LAI), a Route Area Code (RAC) and an RNC ID, and an extended RNC ID. The RLF report can also comprise a UMTS Terrestrial Radio Access Network (UTRAN) Radio Network Temporary Identifier (U-RNTI) of the UE in the last cell serving the UE, a TAI or a LAI and an RAC at which the last cell serving the UE is located, a TAI or a LAI and an RAC of the cell at which the UE tries to re-establish the connection.

It should be noted that if the last cell serving the UE, the cell at which the UE tries to re-establish the connection or the cell which triggers the handover process for the last time are UMTS cells or GERAN cells, then corresponding cell identifiers are a Cell Global Identifier (CGI) or a physical cell ID and frequency. For a GERAN cell, the CGI may comprise a Public Land Mobile Network (PLMN) identifier, a Location Area Code (LAC), cell identifier, and may also comprise a RAC; for a UMTS cell, the CGI may comprise a LAI, an RAC, an RNC ID and a CI, and may also comprise an extended RNC ID.

It also should be noted, if the cell in which the last handover command message was received by the UE is a UTMS cell, then an LAI and an RAC at which the cell is located may also be included; if the cell is a LTE cell, then a TAI at which the cell is located may also be included. According to exemplary embodiments of the present invention, the cell identifier may be a global cell Identifier or a physical channel identifier and frequency information.

At step 303 a base station, which receives the RLF report sent by the UE, determines a cause of the RLF or the handover failure.

At step 303, one method for determining inter-RAT MRO can be if the UE has been handed over between different RAT recently, and the cell in which the UE attempt to re-establishes an RRC connection is the source cell or a cell of the source RAT, then the cause of the RLF or the handover failure is a too early inter-RAT handover. If the UE has not been handed over recently, then the last cell serving the UE and the cell in which the RRC connection attempts to re-establish are cells of different RAT. For example, if the last cell serving the UE is a cell of Long Term Evolution (LTE), and the re-establishment attempt cell is a cell of UMTS, then the cause of the RLF or the handover failure is a too late inter-RAT handover.

If the UE has been handed over between different RAT recently, and the cell in which the UE attempts to re-establish an RRC connection for the first time after the failure is a cell different from the RAT type of the source cell and the target cell of the latest handover, then the cause of the RLF or the handover failure is a handover to a wrong RAT.

It should be noted that at step 303, the cause of the RLF or the handover failure encountered by the UE may comprise a too early handover, a too late handover, a handover to a wrong cell, a too early inter-RAT handover, a too late inter-RAT handover, a handover to a wrong RAT, a coverage hole, and/or the like.

At step 304, if the cause of the connection failure is a coverage hole, then the base station which receives the RLF report sent by the UE sends a coverage hole indication to the base station in which the cell having the hole is located, (e.g., a base station at which the last cell serving the UE is located).

It should be noted that the message comprising the coverage hole indication comprises the global cell identifier of the last cell serving the UE.

At step 305, if the cause of the RLF or the handover failure is a problem of Mobility Robustness Optimization (MRO), such as a too early handover, a too late handover, a handover to a wrong cell, a too early inter-RAT handover, a too late inter-RAT handover and a handover to a wrong RAT, then a base station which detects the problem sends a corresponding MRO report to the base station which triggers the too early, too late or handover to a wrong cell/RAT.

It should be noted that the message of the MRO report comprises the cell identifier of the source cell which triggers the handover for the last time and the cell identifier of the target cell which triggers the handover for the last time. If the cause of the RLF or the handover failure is a too early inter-RAT handover, a too late inter-RAT handover or a handover to a wrong RAT, then the message can further include RAT type of the target cell of the handover.

After the foregoing, the procedure of the first method for detecting the cause of the RLF or handover failure encountered by the UE is finished.

Based on the above first method, three exemplary embodiments of the present invention are described below for illustration.

First Exemplary Embodiment

Figure 4:
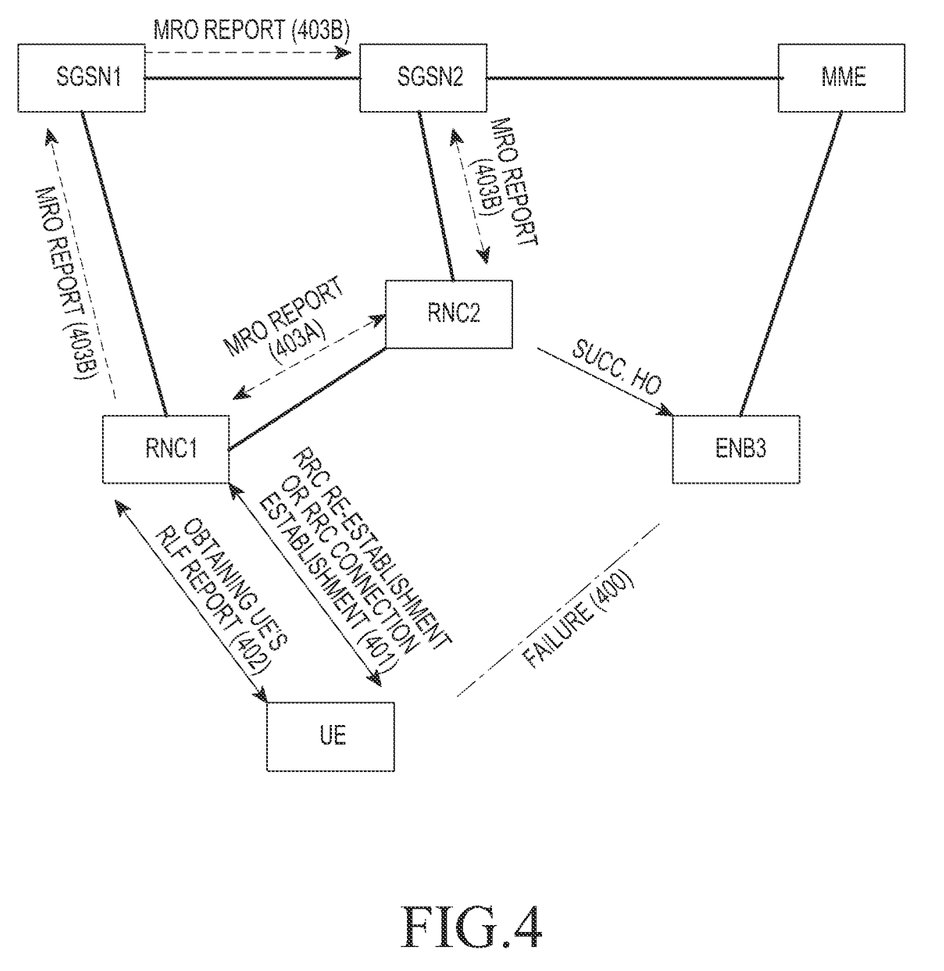
FIG. 4 is a flowchart of a method for detecting a cause of an RLF or a handover failure according to a first exemplary embodiment of the present invention.

FIG. 4 is a flowchart of a method for detecting a cause of an RLF or a handover failure according to a first exemplary embodiment of the present invention.

This exemplary embodiment of the present invention can be applied in the following contexts but is not so limited: a RNC2 successfully switches the UE from a cell 2 (e.g., a cell under the RNC2) to a cell 3 under an eNB3, soon, the UE encounters an RLF in the cell 3, and the UE establishes an RRC connection in a cell 1 of a RNC1; or a handover failure occurs in the process that a RNC2 switches the UE from a cell 2 (e.g., a cell under the RNC2) to a cell 3 under an eNB3, and the UE establishes an RRC connection in a cell 1 of a RNC1.

Referring to FIG. 4, at step 400 the UE encounters an RLF or handover failure in a cell 3, wherein the cell 3 is a cell controlled by an eNB3.

For a handover failure, a failure cell identifier may be set to be a global cell Identifier or a physical cell identifier and frequency of the target cell of the handover (i.e., the cell 3); for an RLF, a failure cell identifier may be set to be a global cell Identifier or physical cell identifier and frequency of a cell where the RLF occurs (i.e., the cell 3).

The stored previous cell identifier is the global cell Identifier or the physical cell identifier and frequency of the cell in which the UE receives handover command for the last time before the failure (i.e., the cell 2), and may further comprise a LAI and an RAC at which the previous cell is located.

At step 400, the UE stores time from receiving the last handover command to the RLF or the handover failure.

At step 401, the UE initiates an RRC connection re-establishment or RRC connection establishment process in the cell 1, wherein the cell 1 is a cell controlled by a RNC1.

At step 401, because the cell 1 is a cell of UMTS, the UE initiates the RRC connection establishment process, if the cell 1 is a cell of LTE, then the UE may initiate the RRC connection re-establishment process.

After the RRC connection re-establishment process is successful or an RRC connection establishment process is successful, the UE indicates to the network that there is RLF report information.

It should be noted that at step 401, the available RLF report information indication may be comprised in an RRC re-establishment completion message or an RRC establishment completion message, and the available RLF report information may be information of a handover failure or information containing handover failure.

At step 402, the UE goes into an active state, connects to UTRAN system, and sends the RLF report to the RNC1.

It should be noted that at step 402, the UE reporting the RLF report to the current base station (RNC1) comprises the following steps: the RNC1 sends an RLF report request to the UE, and the UE sends the RLF report to the RNC1 after the UE receives the request message.

The RLF report comprises the same contents as those in the failure information transmitted by the UE to the eNB at step 302 described above with reference to FIG. 3, and will not be described again herein.

After the RNC1 receives the RLF report, the RNC1 determines a cause of the RLF or the handover failure. After the RNC1 excludes a problem of coverage according to the radio measurement of the UE, if there is an MRO problem within UMTS, a method in which the RNC1 determines a cause of the RLF or handover failure is: if there is no latest handover process before the connection failure (i.e., the UE does not report time or the reported time is larger than a configured limit), then the cause of the RLF or the handover is a too late handover; if there is a latest handover process before the connection failure (i.e., the time reported by the UE is smaller than a configured limit, and the cell in which the UE tries RRC connection establishment for the first time after the RLF or handover failure, is the cell which triggers the handover for the last time and serving the UE), then the cause of the RLF or the handover is a too early handover; if there is a latest handover process before the connection failure (i.e., the time reported by the UE is smaller than a configured limit, and the cell in which the UE tries RRC connection re-establishment or establishment for the first time after the connection failure, is not the cell which triggers the handover for the last time and serves the UE, and is not the cell which serves the UE when the RLF occurs, and is not the target cell of the last handover), then the cause of the RLF or the handover failure is a handover over to a wrong cell.

If there is an MRO problem between different RAT, then there are two methods for determining a cause of the failure and reporting MRO. These methods are described below.

According to a first method for determining a cause of the failure and reporting MRO, the method for determining a cause of the failure is the same to those of the above, the MRO report comprises type of a target RAT of the last handover, or comprises the cell identifier of the target cell of the last handover, and can further contain a LAI and an RAC or a TAI at which the target cell is located; the MRO message can further comprise an inter-RAT handover problem indication. The base station at which a cell which receives the MRO report is located determines that the problem is inter-RAT problem according to the received information, at step 403.

According to a second method for determining a cause of the failure and reporting MRO, the method for determining a cause of the failure is: if the UE has been handed over between different RAT recently (i.e., the time reported by the UE is smaller than a configured limit, the target cell and a the source cell of the last handover belong to different RAT, and the cell in which the UE attempts to re-establish an RRC connection is the source cell or a cell of the source RAT), then the cause of the RLF or handover failure is a too early inter-RAT handover.

There is no latest handover, if the last cell serving the UE and the first RRC connection establishment/re-establishment attempt cell after the failure are cells of different RAT. For example, the last cell serving the UE is a cell of LTE, and the re-establishment attempt cell is a cell of UMTS, then the cause of the RLF or the handover failure is a too late inter-RAT handover.

If the UE has been handed over between different RAT recently, and the cell in which the UE attempt to re-establishes an RRC connection for the first time after the failure is a cell different from the RAT type of the source cell and the target cell of the latest handover, then the cause of the RLF or the handover failure is handover to a wrong RAT.

At step 403a, if the RNC2 is the base station which triggers handover for the last time, and the RNC1 and the RNC2 have an Iur interface, then the RNC1 sends the MRO report to the RNC2 through the Iur interface to notify the RNC2 of the MRO problem.

At step 403a, the MRO problem includes an occurrence of a too early inter-RAT handover; the message of the MRO report comprises the cell identifier of the cell which triggers the handover for the last time, and may also comprise a type of the target RAT, and/or RAT type of the cell in which an RRC connection establishment is attempted for the first time after the RLF or handover failure, and may comprise the cell identifier of the target RAT cell, for example, ECGI of the target cell in the last handover to the eNB1, and may further comprise the global cell identifier of the cell in which an RRC connection establishment is tried for the first time after RLF or handover failure, thus, the RNC2 knows that the source cell triggers a too early inter-RAT handover.

With reference to the first method for determining a cause of the failure and reporting MRO at step 402 for determining a cause of the failure, the RNC1 indicates a handover to a wrong RAT to the RNC2, the message of the MRO report comprises the cell identifier of the cell which triggers the handover for the last time, and may also comprise a type of the target RAT, and/or RAT type of the cell in which an RRC connection establishment is tried for the first time after the RLF or handover failure, and may also comprise the cell identifier of the target RAT cell, for example, ECGI of a target cell in the last handover to the eNB1, and may further comprises the global cell identifier of the cell in which an RRC connection establishment is tried for the first time after RLF or handover failure. The RNC2 may be aware or may determine that an inappropriate inter-RAT handover occurs according to the type of the target RAT, RAT type of the cell at which RRC establishment attempt is made after the failure, and the RAT type of the source cell which triggers the handover for the last time. For example, the UE is switched from the RAT1 to the RAT2, just switching successfully, the UE fails and returns to the RAT1 to establish an RRC connection, or failure occurs in the switching process, the UE returns to the RAT1 to establish an RRC connection, then the RNC2 determines the failure as a too early inter-RAT handover; or the message of the MRO report comprises an inter-RAT handover indication, the RNC2 determines the failure as a too early inter-RAT handover according to the indication and the received cell identifiers; or the RNC2 may be aware or may determine the cell which triggers the handover for the last time, the target cell for the last time, and the RAT type of the cell in which an RRC connection establishment is attempted for the first time after RLF or handover failure, and determines the failure as a too early inter-RAT handover.

At step 403b, if the RNC2 is the base station which triggers handover for the last time, and there is no Iur interface between the RNC1 and the RNC2, then the RNC1 sends the MRO report to the SGSN through the Iur interface, and the SGSN sends the MRO report to the RNC2.

The message of the MRO report comprises a Public Land Mobile Network (PLMN) identifier, a LAC, an RAC, an RNC ID, or an extended RNC ID of an RNC at which the cell in which the UE triggers handover for the last time is located, and may also comprise a CGI of the cell which triggers the handover for the last time. At step 403b, the RNC1 and the RNC2 can be connected to the same or different SGSN, if the RNC1 and the RNC2 are connected to different SGSN (for example, the RNC1 and the RNC2 are connected to SGSN1 and SGSN2, respectively), then the SGSN1 sends the MRO report to the SGSN2, and the SGSN1 routes messages between different SGSN according to the LAI and RAC.

It should be noted that the SGSN sends the MRO report to the RNC2 according to the PLMN identifiers and the RNC ID or the extended RNC ID.

The MRO problem includes an occurrence of a too early inter-RAT handover; the message of the MRO report comprises the cell identifier of the cell which triggers the handover for the last time, and may also comprise type of the target RAT, and/or RAT type of the cell in which an RRC connection establishment is attempted for the first time after the RLF or handover failure, and may comprise the cell identifier of the target RAT cell, for example, ECGI of the target cell in the last handover to the eNB1, and may further comprise the global cell identifier of the cell in which an RRC connection establishment is tried for the first time after RLF or handover failure. Thus, the RNC2 knows that the source cell triggers a too early inter-RAT.

With reference to the second method for determining a cause of the failure and reporting MRO at step 402 for determining a cause of the failure, the RNC1 indicates handover to a wrong cell to the RNC2 through the Iur interface; the message of the MRO report comprises the cell identifier of the cell which triggers the handover for the last time, and may also comprise a type of the target RAT, and/or RAT type of the cell in which an RRC connection establishment is tried for the first time after the RLF or handover failure, may further comprise an indication, and may also comprise the cell identifier of the target RAT cell, for example, ECGI of the target cell in the last handover to the eNB1, and may further comprise the global cell identifier of the cell in which an RRC connection establishment is tried for the first time after the RLF or the handover failure. The RNC2 may be aware or may determine that an inappropriate inter-RAT handover occurs according to the type of the target RAT, RAT type of the cell at which RRC establishment attempt is made after the failure and the RAT type of the source cell which triggers the handover for the last time or according to the inter-RAT handover problem indication; for example, the UE is switched from the RAT1 to the RAT2, just switching successfully, the UE fails and returns to the RAT1 to establish an RRC connection, or failure occurs in the switching process, the UE returns to the RAT1 to establish an RRC connection, then the RNC2 determines the failure as too early inter-RAT handover; or the RNC2 knows the cell which triggers the handover for the last time before the failure, the target cell which triggers the handover for the last time before the failure, and the RAT type of the cell in which an RRC connection establishment is tried for the first time after RLF or handover failure, and determines the failure as too early inter-RAT handover. For too late inter-RAT handover, the RNC2 may be aware or may determine that the RLF or the handover failure is a too late inter-RAT handover according to that the RAT type of the last cell serving the UE is different from the RAT type of the cell where the RRC establishment attempt is made after the failure and there is no recent HO procedure.

After the foregoing, the procedure of the method for detecting the cause of the RLF or handover failure of the first exemplary embodiment of the present invention is finished.

Second Exemplary Embodiment

Figure 5:
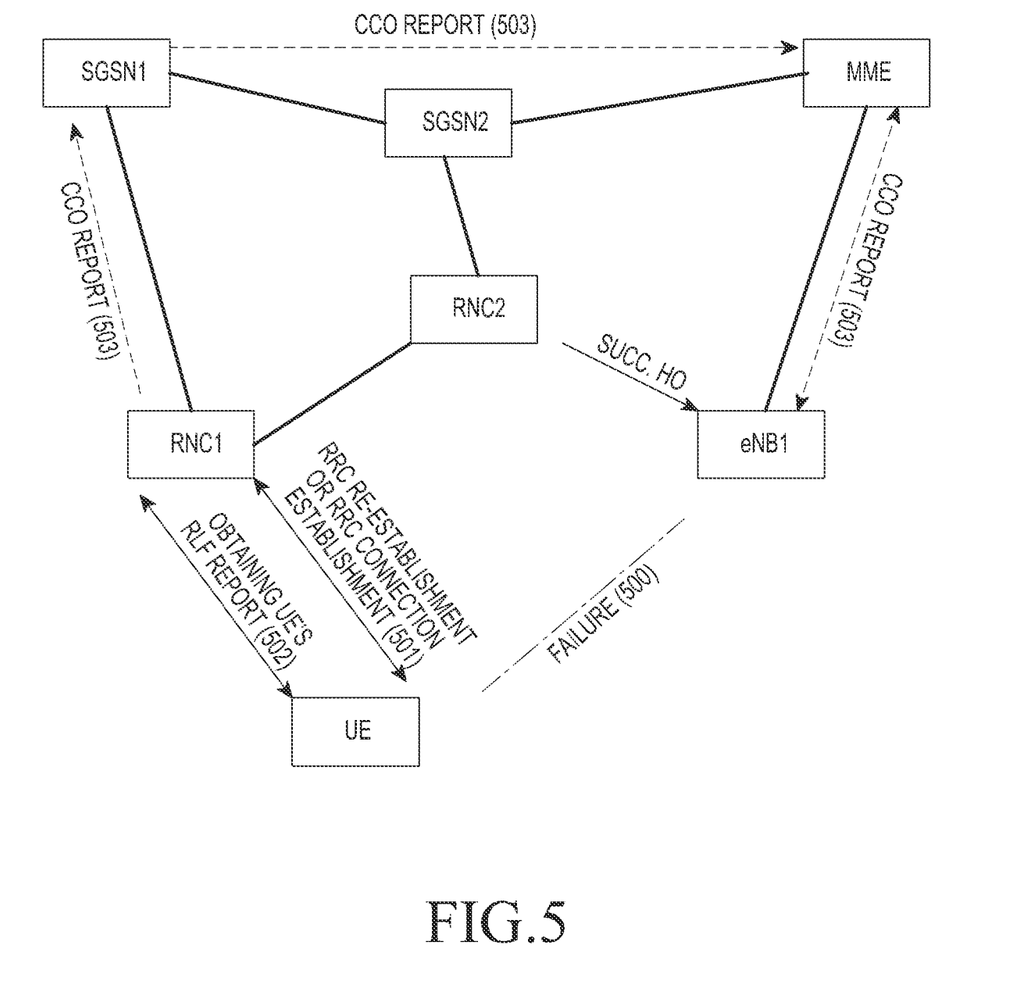
FIG. 5 is a flowchart of a method for detecting a cause of an RLF or a handover failure according to a second exemplary embodiment of the present invention.

Based on the above method, FIG. 5 is a flowchart of a method for detecting a cause of an RLF or a handover failure according to the second exemplary embodiment of the present invention.

Referring to FIG. 5, this exemplary embodiment of the present invention can be applied in the following contexts but is not so limited: a RNC2 successfully switches the UE from a cell 2 (e.g., a cell under the RNC2) to a cell 3 under an eNB3; the UE encounters an RLF in the cell 3, and the UE establishes an RRC connection in a cell 1 of a RNC1, or a handover failure occurs in the process that a RNC2 switches the UE from a cell 2 (a cell under the RNC2) to a cell 3 under an eNB3, and the UE establishes an RRC connection in the cell 1 of the RNC1.

Step 500 to step 501 are the same to the step 400 to step 401 which are described with reference to FIG. 4, and will not be repeated here.

At step 502, the UE goes into an active state, connects to a UTRAN system, and sends the RLF report to the RNC1.

It should noted, at step 502, the UE reporting the RLF report to the current base station (RNC1) comprises the following steps: the RNC1 sends an RLF request to the UE, and the UE sends the RLF report to the RNC1 after the UE receives the request message. The RLF report comprises the same contents as those in the failure information transmitted by the UE to the eNB in step 302 described in reference to FIG. 3, and will not be described again herein.

The RNC1 determines a cause of the RLF or the handover failure. In this exemplary embodiment of the present invention, the RNC1 may be aware or may determine that the cause of the RLF or the handover failure is a problem of coverage according to the radio measurement of the UE.

At step 503, if the cause of the RLF or the handover failure is a problem of coverage, the RNC1 sends a CCO report to a base station at which the last cell serving the UE is located.

In this step, the RNC1 sends the CCO report to the base station at which the last cell serving the UE through the core network. The message of the CCO report contains CCO information and the cell identifier of the last cell serving the UE, and may further comprise a TAI of the cell.

It should noted, at step 503, the SGSN sends the CCO report to the MME according to the TAI, and the MME sends the CCO report to the eNB1; the message of the CCO report comprises CCO information and the cell identifier of the last cell serving the UE. Thus, the eNB1 may be aware or may determine that the corresponding cell has the problem of coverage.

After the foregoing, the procedure of the method for detecting the cause of the RLF or handover failure of the second exemplary embodiment of the present invention is finished.

Third Exemplary Embodiment

Figure 6:
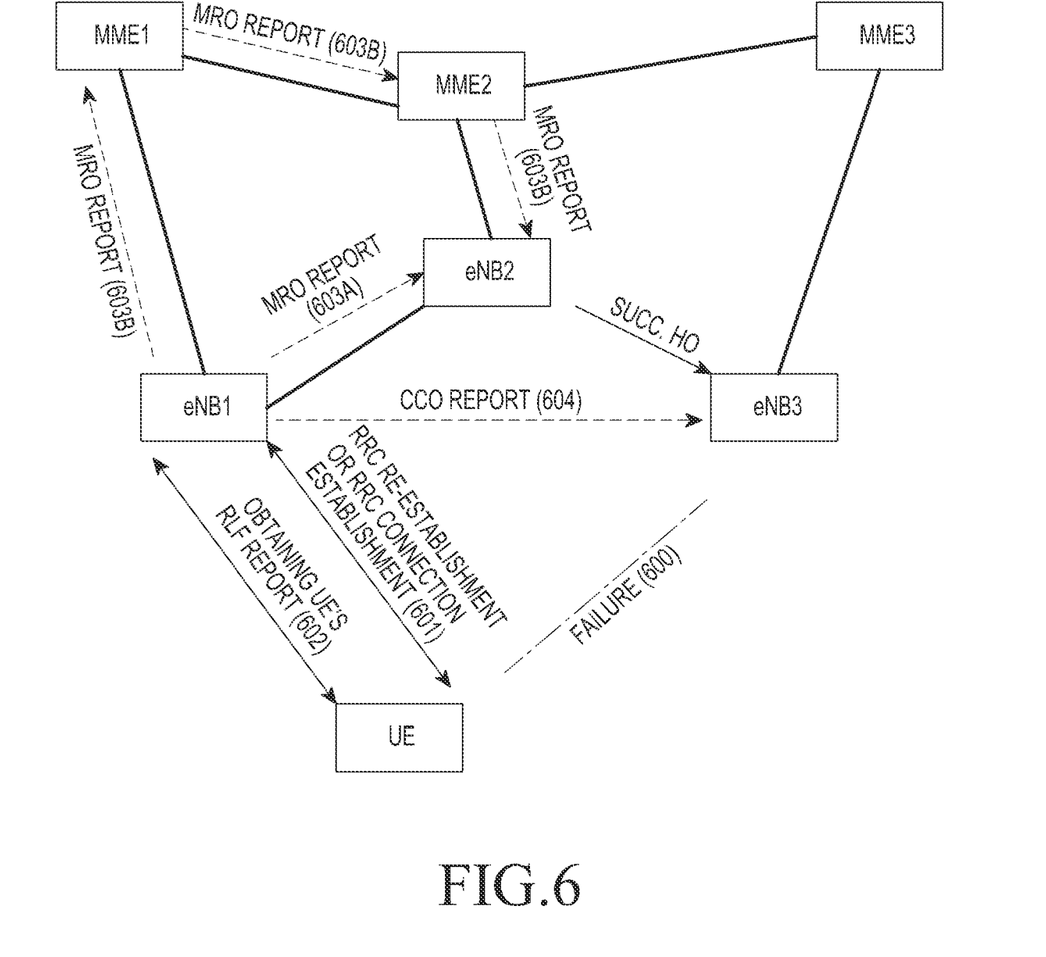
FIG. 6 is a flowchart of a method for detecting a cause of an RLF or a handover failure according to a third exemplary embodiment of the present invention.

Based on the above method, FIG. 6 is a flowchart of a method for detecting a cause of an RLF or a handover failure according to a third exemplary embodiment of the present invention.

Referring to FIG. 6, at step 600, the UE encounters an RLF or a handover failure in a cell 3, wherein the cell 3 is a cell controlled by an eNB3.

At step 601, the UE initiates an RRC connection re-establishment or RRC connection establishment process in the cell 1, wherein the cell 1 is a cell controlled by a RNC1.

After the RRC connection re-establishment process is successful or an RRC connection establishment process is successful, the UE indicates to the network that there is RLF report information.

At step 601, the available RLF report information indication can be comprised in an RRC re-establishment completion message or RRC establishment completion message, and the available RLF report information can be information of handover failure or information containing handover failure.

At step 602, the UE goes into an active state and sends the RLF report to the eNB1.

It should noted that at step 602, the UE reporting the RLF report to the current base station (eNB1) comprises the following steps: the eNB1 sends a UE information request to the UE, and the UE sends a UE information response to the eNB1 after the UE receives the request message. The RLF report comprises the same contents as those in the failure information transmitted by the UE to the eNB in the step 302 which are described with reference to FIG. 3, and will not be described again herein.

After the eNB1 receives the RLF report, the eNB1 determines a cause of the RLF or the handover failure, at step 602, if the eNB1 excludes a problem of coverage according to the radio measurement of the UE, then a method in which the eNB1 determines a cause of the RLF or handover failure includes: if there is no recent handover process before the connection failure (i.e., the UE does not report timer or the reported timer is larger than a configured limit), then the cause of the RLF or the handover failure is a too late handover; if there is a latest handover process before the connection failure (i.e., the timer reported by the UE is smaller than a configured limit, and the cell in which the UE tries establishment is the cell which triggers the handover for the last time and serves the UE), then the cause of the RLF or the handover failure is a too early handover; if there is a recent handover process before the connection failure (i.e., the timer reported by the UE is smaller than a configured limit, and the cell in which the UE tries RRC connection re-establishment or establishment for the first time after the failure, is not the cell which triggers the handover for the last time and serves the UE, and is not the cell which serves the UE when the RLF occurs, and is not the target cell of the last handover), then the cause of the RLF or the handover failure is a handover over to a wrong cell.

At step 603*a*, if the eNB2 is the base station at which the cell which triggers handover for the last time is located, and the eNB1 and the eNB2 have X2 interface, then the eNB1 sends the MRO report to the eNB2 through the X2 interface to notify the eNB2 that a too early handover or handover to wrong cell occurs. For a too late handover, the eNB1 sends an MRO report with a too late handover message to the base station at which the last cell serving the UE is located through the X2 interface.

The message of the MRO report comprises the global cell identifier of the cell which triggers the handover for the last time, the global cell identifier of the target cell of the last handover and the global cell identifier of the cell in which the UE tries RRC re-establishment for the first time after the failure.

At step 603*b*, if the eNB2 is the base station at which the cell which triggers handover for the last time is located, and there is no X2 interface between the eNB1 and the eNB2, then the eNB1 sends the MRO report to the MME through the S1 interface, and the MME sends the MRO report to the eNB2.

In this step, the message of the MRO report comprises the TAI at which the cell in which the UE triggers handover for the last time is located, and may also comprise an indication of a too early handover, a too late handover, or a handover to a wrong cell, and may also comprise the global cell identifier of the target cell of the last handover, and the global cell identifier of the cell in which the UE tries RRC re-establishment for the first time after the failure It should be noted that the eNB1 and the eNB2 can be connected to the same or different MME. If the eNB1 and the eNB2 are connected to different MME (for example, the eNB1 and the eNB2 are connected to MME1 and MME2, respectively), then the MME1 sends the MRO report to the MME2, the MME1 routes messages between different MME according to the TAI, and the MME sends the MRO report to the eNB2 according to the global cell identifier.

It also should be noted that the message of the MRO report sent to the eNB2 comprises an indication of a too early handover, a too late handover, or a handover to a wrong cell, and may further comprise the global cell identifier of the cell which triggers the handover for the last time, the global cell identifier of the target cell of the last handover and the global cell identifier of the cell in which the UE tries RRC re-establishment for the first time after the failure.

At step 604, if the eNB1 determines that the cause of the RLF or the handover failure is a problem of coverage according to the measurement of the UE, the eNB1 sends a CCO report to the base station at which the last cell serving the UE is located, and the message of the CCO report comprises the cell identifier of the last cell serving the UE.

It should be noted, that at step 604, if the eNB1 and the last cell serving the UE such as eNB3 have an X2 interface, then the message is sent through the X2 interface; if the eNB1 and the last cell serving the UE such as eNB3 do not have an X2 interface, then the message is sent through the S1 interface, when sending the CCO report through the S1 interface, the eNB1 needs to send TAI of the last cell serving the UE to the MME, and the TAI is used to route the message of the CCO report in the core network. Thus, the last cell serving the UE knows there is a problem of coverage.

After the foregoing, the procedure of the method for detecting the cause of the RLF or handover failure of the third exemplary embodiment of the present invention is finished.

Figure 7:
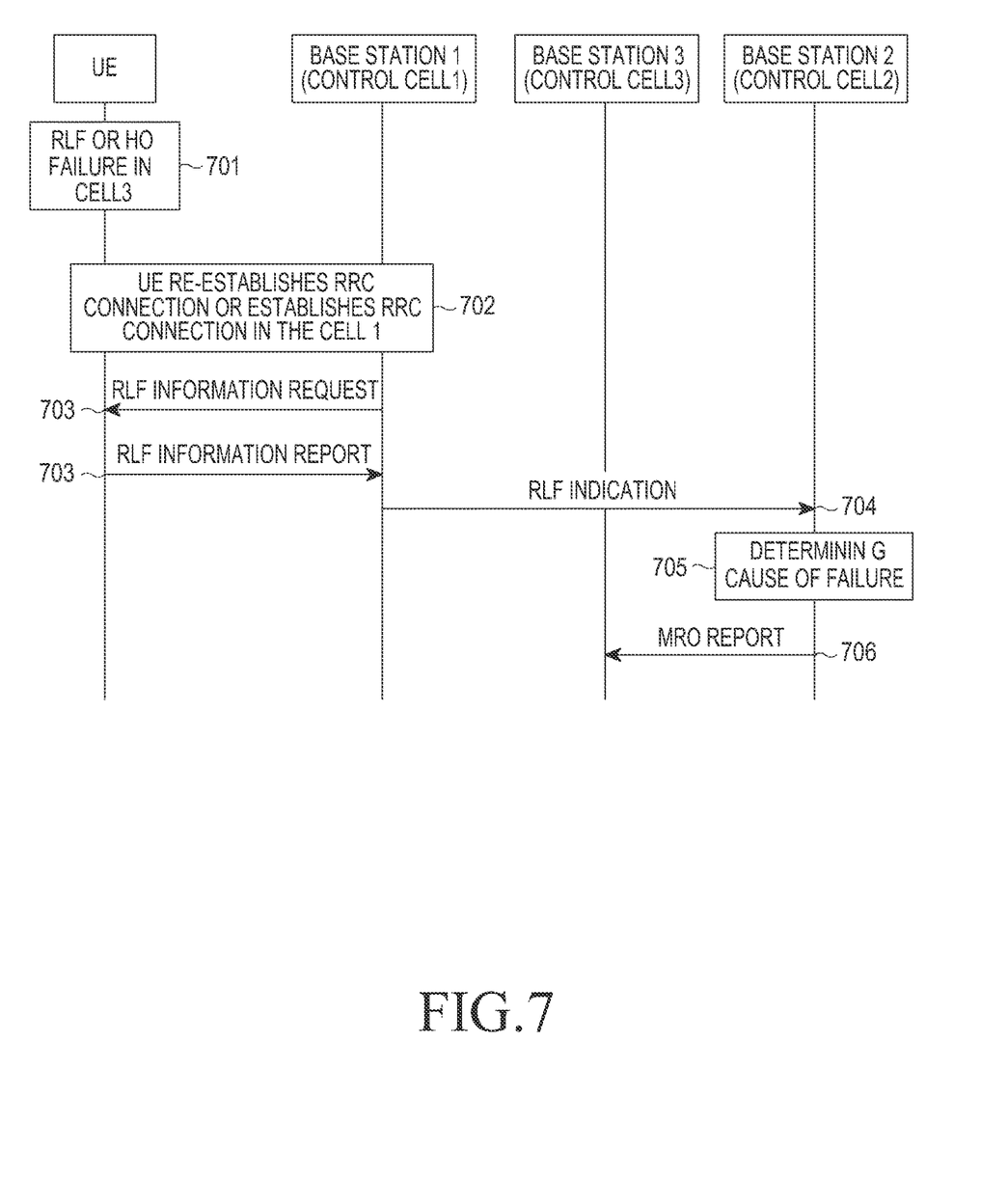
FIG. 7 is a flowchart of a second method for detecting a cause of an RLF or a handover failure according to an exemplary embodiment of the present invention.

FIG. 7 is a flowchart of a second method for detecting a cause of an RLF or a handover failure according to an exemplary embodiment of the present invention.

Referring to FIG. 7, this exemplary embodiment of the present invention can be applied in the following contexts but is not so limited: a base station 2 successfully switches the UE from a cell 2 (a cell under the base station 2) to a cell 3 under a base station 3, the UE encounters RLF in the cell 3, and the UE establishes an RRC connection in a cell 1 of a base station 1, or a handover failure occurs in the process that a base station 2 switches the UE from a cell 2 (a cell under the base station) to a cell 3 under an base station 3, and the UE establishes an RRC connection in a cell 1 of a base station 1.

At step 701, the UE encounters an RLF or handover failure in a cell 3, wherein the cell 3 is a cell controlled by a base station 3.

At step 702, the UE initiates an RRC connection re-establishment or RRC connection establishment process in the cell 1, wherein the cell 1 is a cell controlled by a base station 1.

In this step, in actual application, the UE can initiate an RRC connection re-establishment process in the cell 1, and the re-establishment process succeeds; or, after an RRC connection re-establishment initiated by the UE in the cell 1 fails, the UE initiates an RRC connection establishment process, and the RRC connection establishment succeeds; or, the UE directly initiates an RRC connection establishment in the cell 1, and the RRC connection establishment succeeds, or, after the UE initiates an RRC connection re-establishment in other cell and the RRC connection re-establishment fails, the RRC connection establishment succeeds in the cell 1.

The available RLF report information indication may be comprised in an RRC re-establishment completion message or RRC establishment completion message, and the available RLF report can be information of handover failure or information containing handover failure.

At step 703, the UE goes into an active state and sends the RLF information report to the base station 1.

It should be noted, that at step 703, the UE reporting the RLF information to the current base station (base station 1) comprises the following steps: the base station 1 sends an RLF information request to the UE, and the UE sends the RLF information report to the eNB1 after the UE receives the request message. The RLF information request and the RLF information reporting process may be an existing UE information request and UE information response process, and may also be a new defined RRC message or process.

The RLF information report comprises the same contents as those in the failure information transmitted by the UE to the eNB at step 302 described with reference to FIG. 3, and will not be described again herein.

At step 704, the eNB1 sends an RLF indication to the base station eNB2 at which a cell in which the RLF occurs is located.

For handover failure, the eNB1 sends the RLF indication to the base station eNB2 at which the last cell serving the UE (i.e., the source cell in which the handover failure occurs) is located.

At step 705, the eNB2 determines a cause of the RLF or handover failure encountered by the UE.

At step 705, the eNB2 excludes a problem of coverage according to the radio measurement of the UE. If there is an MRO problem within LTE, a method in which the eNB2 determines a cause of the RLF or handover failure is: if there is no recent handover process before the connection failure (i.e., the UE does not report time or the reported timer is larger than a configured limit), then the cause of the RLF or the handover failure is a too late handover; if there is a recent handover process before the connection failure (i.e., the timer reported by the UE is smaller than a configured limit, and the cell in which the UE tries RRC connection establishment for the first time after the RLF or handover failure, is the cell which triggers the handover for the last time and serves the UE), then the cause of the RLF or the handover failure is a too early handover; if there is a recent handover process before the connection failure (i.e., the timer reported by the UE is smaller than a configured limit, and the cell in which the UE tries RRC connection re-establishment or establishment for the first time after the connection failure, is not the cell which triggers the handover for the last time and serves the UE, and is not the cell which serves the UE when the RLF occurs, and is not the target cell of the last handover), then the cause of the RLF or the handover failure is a handover over to a wrong cell.

Further, if there is an MRO problem between different RAT, then there are two kinds of methods for determining a cause of the failure and reporting MRO:

According to a first method for determining a cause of the failure and reporting MRO, the method for determining a cause of the failure is the same to those of the above. The MRO report comprises a type of a target RAT of the last handover, or the MRO report message comprises a LAI and an RAC or a TAI of the target cell of the last handover; the MRO report message may further comprise an inter-RAT handover problem indication. The base station at which the cell which receives the MRO report is located determines that it is inter-RAT problem according to the received information, and the specific description is made with reference to the step 706.

According to a second method for determining a cause of the failure and reporting MRO, the method for determining a cause of the failure is: if the UE has been handed over between different RAT recently (i.e., the timer reported by the UE is smaller than a configured limit, the target cell and the source cell of the last handover belong to different RAT, and the cell in which the UE re-establishes an RRC connection is the source cell or a cell of the source RAT), then the cause of the RLF or the handover failure is a too early inter-RAT handover.

If there is no recent handover and the last cell serving the UE and the first RRC connection establishment/re-establishment attempt cell after the failure are cells of different RAT, for example, the last cell serving the UE is a cell of LTE, and the establishment/re-establishment cell is a cell of UMTS, then the cause of the RLF or the handover failure is a too late inter-RAT handover.

If the UE has been handed over between different RAT recently, and the cell in which the UE attempt to re-establishes an RRC connection for the first time after the failure is a cell different from the RAT type of the source cell and the target cell of the latest handover, then the cause of the RLF or the handover failure is a handover to a wrong RAT.

At step 706, when the eNB2 determines that the cause of the failure is a too early handover, a handover to a wrong cell, a too early inter-RAT handover, or a handover to a wrong RAT cell, the eNB2 needs to send the MRO report to the source cell which triggers the handover for the last time.

The MRO report comprises information of a corresponding too early handover, a handover to a wrong cell, a too early inter-RAT handover, or a handover to a wrong RAT cell; the message of the MRO report may also comprise the cell identifier of the cell which triggers the handover for the last time, the cell identifier of the cell in which an RRC is attempted to be established or re-established after the failure and the cell identifier of the target cell of the last handover.

It should be noted that the MRO report message may further comprise a type of the target RAT of the last handover, the cell identifier of the target cell of the last handover, a LAI and an RAC or a TAI of the target cell of the last handover, the MRO report message may further comprise an inter-RAT handover problem indication. The base station at which the cell which receives the MRO report is located determines that the problem is inter-RAT problem according to the received information.

In conclusion, in the method for detecting cause of RLF or handover failure according to exemplary embodiments of the present invention, when the UE encountering RLF or handover failure enters a connection mode, a RLF report comprising an indication that the UE encounters an RLF or a handover failure is sent to the base station by the UE, the base station which receives the RLF report determines a cause of encountering the RLF or the handover failure containing a MRO problem, and then the MRO report is sent by the base station to the base station at which the cell which triggers handover for the last time is located; or a RLF report comprising related information of encountering inter-RAT failure is sent to the base station by the UE, the base station which receives the RLF report sends the RLF report to the base station at which the last cell serving the UE is located, and the base station at which the last cell serving the UE is located determines that a cause of the MRO problem causing RLF or handover failure, and then the MRO report comprising inter-RAT handover problem indication is sent to the base station which triggers handover for the last time.

Using the base station which receives the RLF report to determine a cause of RLF or handover failure, it is not needed to first transmit the RLF indication between the base stations and then send the MRO report; particularly, when the above messages are sent between different RAT, the messages are sent through the CN, the signaling process is complex. One aspect of an exemplary embodiment of the present invention is that the system and method is more optimized than the mechanisms according to the related art.

In another aspect of exemplary embodiments of the present invention, because the RLF report comprising related information of encountering inter-RAT failure is sent to the network and the base station which receives the RLF report or the last base station serving the UE determines a cause of the failure, the cause for the UE encounters RLF or handover failure between different RAT can be correctly detected, and then correct self-optimization for the mobile communication system can be performed according to the detected cause, thereby improving the performance of the mobile communication system.

Finally, in the method according to exemplary embodiments of the present invention, because the MRO report comprising the inter-RAT handover problem indication is sent to the base station, the cause for the UE encounters RLF or handover failure between different RAT can be correctly detected, and then correct self-optimization for the mobile communication system can be performed according to the detected cause, thereby improving the performance of the mobile communication system.

While the invention has been shown and described with reference to certain exemplary embodiments thereof, it will be understood by those skilled in the art that various changes in form and details may be made therein without departing from the spirit and principle of the invention as defined by the appended claims and their equivalents.

What is claimed is:

1. A method for detecting a connection failure by a first base station in a wireless communication system, the method comprising:
receiving, through an S1 interface, a message including a radio link failure (RLF) report from a second base station which receives the RLF report from a user equipment (UE) when the connection failure occurs at the UE, wherein the first base station has served the UE before the connection failure and the first base station is located in an evolved universal terrestrial radio access network (E-UTRAN) cell and the second base station is located in a universal terrestrial radio access network (UTRAN) cell;
determining that a cause for the connection failure is a too early inter-radio access technology (RAT) handover, when the UE has been handed over between different RATs before the connection failure and a cell in which the UE attempted re-establishment of a radio resource control (RRC) connection after the connection failure is the UTRAN cell, based on the received message;
determining that the cause for the connection failure is a too late inter-RAT handover, when the UE has not been handed over before the connection failure, and the cell in which the UE attempted the re-establishment of the RRC connection after the connection failure is the UTRAN cell, based on the received message; and
in response to determining that the cause of the connection failure is a coverage hole based on the received message, transmitting, by the first base station, a coverage hole indication to a base station where a last cell serving the UE is located,
wherein the RLF report includes information on a tracking area where the first base station that served the UE before the connection failure is located, and identification information of the E-UTRAN cell,
wherein the cause for the connection failure is the too early inter-RAT handover when a timer reported to the second base station by the UE is smaller than a configured threshold, and the cause for the connection failure is the too late inter-RAT handover when the timer reported to the second base station by the UE is larger than the configured threshold, and
wherein the second base station is a base station located in the cell which the UE attempted the re-establishment of the RRC connection after the connection failure.

2. The method of claim 1, wherein the identification information of the E-UTRAN cell includes frequency information of the E-UTRAN cell.

3. The method of claim 1, wherein the coverage hole indication message includes coverage hole information and a global cell identifier of the last cell serving the UE.

4. A first base station for detecting a radio link failure (RLF) in a wireless communication system, the first base station comprising:
a communication interface configured to communicate with other network entities; and
a controller configured to:
receive, through an S1 interface, a message including an radio link failure (RLF) report from a second base station which receives the RLF report from a user equipment (UE) when a connection failure occurs at the UE, wherein the first base station has served the UE before the connection failure and the first base station is located in an evolved universal terrestrial radio access network (E-UTRAN) cell and the second base station is located in a universal terrestrial radio access network (UTRAN) cell, determine that a cause for the connection failure is a too early inter-radio access technology (RAT) handover, when the UE has been handed over between different RATs before the connection failure and a cell in which the UE attempted re-establishment of a radio resource control (RRC) connection after the connection failure is the UTRAN cell, based on the received message, determine that the cause for the connection failure is a too late inter-RAT handover, when the UE has not been handed over before the connection failure, and the cell in which the UE attempted the re-establishment of the RRC connection after the connection failure is the UTRAN cell, based on the received message, and in response to determining that the cause of the connection failure is a coverage hole based on the received message, transmit a coverage hole indication to a base station where a last cell serving the UE is located, wherein the RLF report includes information on a tracking area where the first base station that served the UE before the connection failure is located, and identification information of the E-UTRAN cell, wherein the cause for the connection failure is the too early inter-RAT handover when a timer reported to the second base station by the UE is smaller than a configured threshold, and the cause for the connection failure is the too late inter-RAT handover when the timer reported to the second base station by the UE is larger than the configured threshold, and wherein the second base station is a base station located in the cell which the UE attempted the re-establishment of the RRC connection after the connection failure.

5. The first base station of claim 4, wherein the identification information of the E-UTRAN cell includes frequency information of the E-UTRAN cell.

6. The first base station of claim 4, wherein the coverage hole indication message includes coverage hole information and a global cell identifier of the last cell serving the UE.

* * * * *